United States Patent Office 2,754,949
Patented July 17, 1956

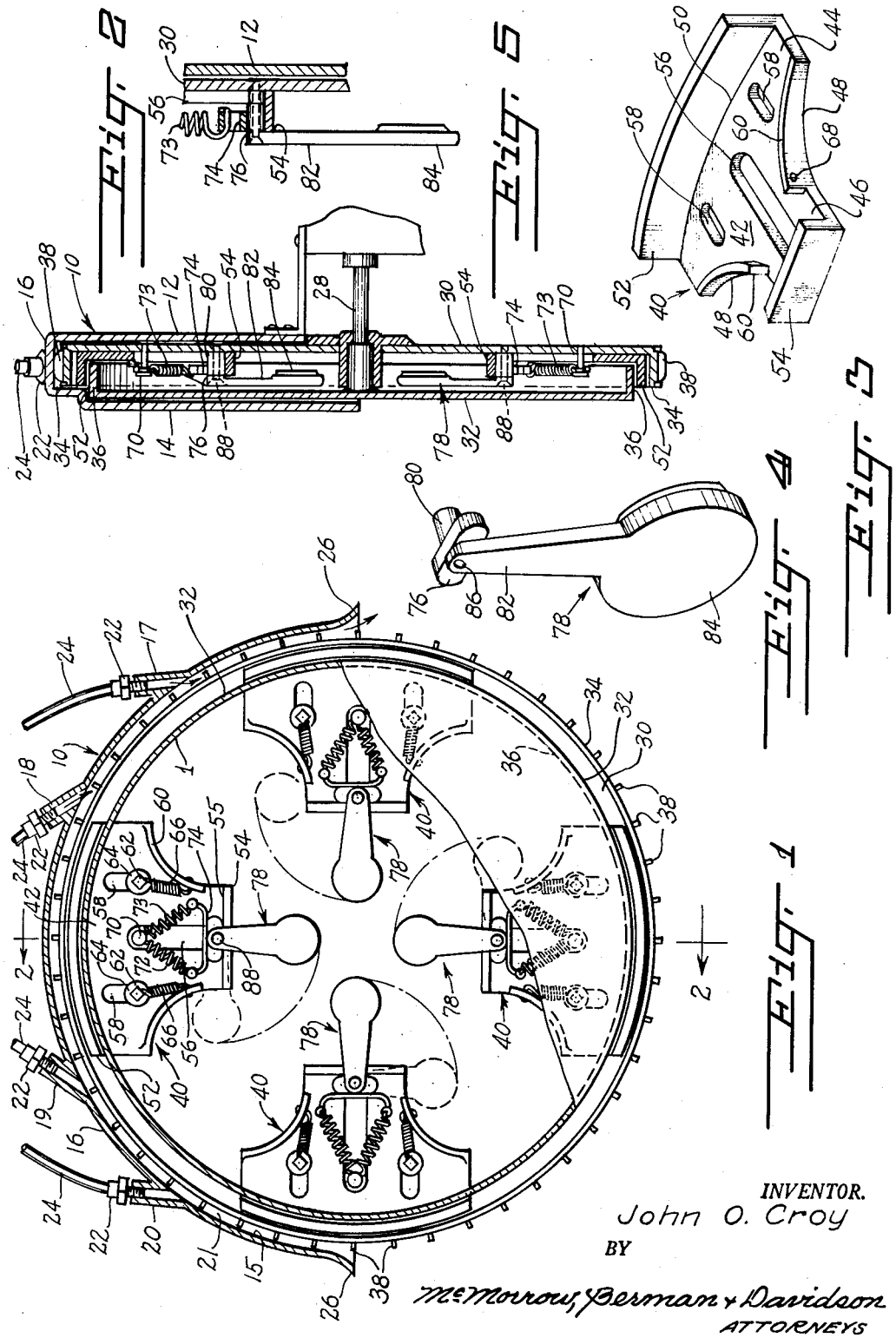

2,754,949

CENTRIFUGAL CLUTCH

John Otto Croy, Callao, Va.

Application October 9, 1953, Serial No. 385,049

2 Claims. (Cl. 192—105)

This invention relates to motion transmission means and more particularly to a clutch of the centrifugal type.

It is an object of this invention to provide a clutch of the centrifugal type as a motion transmission means which is of simple construction, relatively quick acting for engagement and disengagement, has relatively few moving parts and embodies a simple yet rugged structure.

It is a further object of this invention to provide a centrifugal clutch particularly adapted to be driven by fluid pressure means and which may be incorporated into a variety of mechanisms to be driven as a motion transmitting means from the source of fluid pressure or power to the machine or apparatus where such power is utilized.

Other objects and advantages will become apparent from the following detailed description, forming the specification, and taken in conjunction with the accompanying drawings, wherein:

Figure 1 is a side elevational view of the centrifugal clutch embodying this invention, partially broken away, and showing a fluid pressure means capable of being applied to the clutch;

Figure 2 is a cross sectional view taken on line 2—2 of Figure 1 and looking in the direction of the arrows;

Figure 3 is a perspective view of one of the plate-engaging segments; and

Figure 4 is a perspective view of one of the weighted arms.

Figure 5 is an enlarged portion of Figure 2.

With continued reference to the drawings, there is shown housing 10 of inverted U shape in cross section and generally semi-circular in outline. The housing 10 has a pair of spaced parallel sides 12 and 14 of similar semi-circular shape connected together along their arcuate peripheries by a top wall 16, so that the top wall 16 along with the sides 12 and 14 define a semi-circular chamber. Symmetrically disposed to either side of a radial plane dividing the housing 10 into quadrants, are provided pairs of outwardly extending bosses 17 to 20 extending outwardly from the top wall 16 and in angular relation thereto, the bosses 17 and 20 and the bosses 18 and 19 being similar in all respects. Each of the bosses is provided with a central aperture therethrough communicating with the chamber defined by the sides 12 and 14 and the top wall 16. Into the end of each aperture remote from the top wall 16 is inserted a nozzle 22, the other end of which is connected to a tube or pipe 24 extending from a source of fluid pressure, not shown. Along the length of each of the pipes 24 and intermediate its length between the housing 10 and the source of fluid pressure, there is provided the usual valves for controlling the flow of fluid pressure therethrough, the valves not being shown as they are conventional. It should be noted that fluid pressure will be permitted to enter either through the bosses 17 and 18 or the bosses 19 and 20 so that when fluid pressure is flowing through the bosses 17 and 18 suitable valves will cut the flow of pressure off from entering bosses 19 and 20, and vice versa. The free ends 26 of the top wall 16 are flared outwardly so as to permit the escape of fluid pressure introduced through the bosses more readily.

Mounted to rotate within the chamber 21 defined by the side walls 12 and 14 and the top wall 16 of the housing 10 about a drive shaft 28 as the axis of rotation is a driving plate 30 and a driven plate 32. The driving plate 30 is circular in form and carries a peripheral flange 34 extending normally thereto and in a direction toward the driven plate 32 which is in spaced circumferential relation to the driving plate 30, as clearly seen in Figure 2. The driven plate 32 is similar in construction to the driving plate 30, that is it is of circular form and is provided with an annular flange 36 extending normally thereto and in a direction toward the driving plate 30 but spaced somewhat therefrom, the driven plate 32 being of somewhat smaller diameter than the driving plate 30 so that the flange 34 will overlie the flange 36 in closely spaced relation.

The driving plate 30 is provided along its outer periphery with a plurality of equally spaced vanes 38 carried thereon in any suitable manner or may be formed integrally with the plate 30. In Figure 1, it will be seen that the vanes 38 are closely spaced from the interior surface 15 of the top wall 16 so that they may move relative thereto, and it also should be noted that the curvature of the top wall 16 is circularly concentric with the driving plate 30. With this arrangement, fluid pressure entering the chamber 21 through either one or both of the apertures in the bosses 17 and 18 will impinge upon the vanes 38 so as to cause the driving plate 30 to rotate in a clockwise direction about the shaft 28 as an axis, the plate 30 being so mounted upon the shaft 28 as to rotate freely thereon. With fluid pressure cut off from entering the chamber 21 through the apertures in the bosses 17 and 18 and the fluid pressure being permitted to enter the chamber 21 through the apertures in either one or both of the bosses 19 and 20, the fluid pressure will again impinge upon the vanes 38 carried by the driving plate 30 so as to cause the plate 30 to rotate in a counter-clockwise direction. The angular disposition of the bosses 17 to 20 with respect to the top wall 16 insures maximum utilization of the fluid pressure to drive the plate 30 in the desired direction.

The driving plate 30 carries thereon a plurality of plate-engaging segments, generally indicated at 40, four of such segments being shown spaced ninety degrees apart with respect to their respective center lines. Each of the segments 40 are similar in construction and as shown in Figure 3, each segment 40 has a body portion 42 in the form of a plate, the body 42 having a wide or broadened head 44, and a comparatively narrow neck 46, the head 44 and the neck 46 being connected by similar but oppositely disposed curved sides 48. The head 44 has its longitudinal edge formed in an arc of a circle of slightly smaller radius than that of the driving plate 30, and carries along its longitudinal edge 50 an upstanding shoe member 52 disposed normally to the plane of the body 42 and, of course, being provided with the curve corresponding to the curvature of the edge 50. The end of the body 42 of the segment 40 remote from the transverse edge 50 is provided with an upstanding flange 54 also disposed normally to the plane of the body 42. Centrally longitudinally of the body 42, there is provided an elongated slot 56 extending from adjacent the flange 54 to adjacent the shoe 52. In the head 44 of the body 42 there is provided a pair of similar slots 58, one arranged to either side of the slot 56 and generally parallel thereto. Each of the arcuate sides 48 on the body 42 has integrally formed therewith an upstanding stop shoulder 60, the stop shoulder 60 and the shoe 52 as well as the flange 54 all extend laterally from the same face of the body 42 and the neck or stem portion 46.

As seen in Figures 1 and 2, each of the segments 40 are arranged upon the driving plate 30 in such manner that the shoe 52 is slightly spaced inwardly from the peripheral edge of the plate 30 with its arc or curvature concentric with the periphery of the plate 30 and the longitudinal center line through the slots 56 and the segment 40 is coincident with a radial line of the driving plate 30.

The plate engaging means or segments 40 which are carried by the driving plate 30 are mounted for movement radially thereof into and out of engagement with the driven plate 32. In order to so mount the plate engaging means upon the driving plate 30, each of the segments 40 have bolts or pins 62, one of such bolt or pin passing through each of the slots 58 so that the head of the bolt extends upwardly from the driving plate 30 and the other end of the bolt is secured, in any suitable manner, on the plate 30 and is carried thereby. A washer 64 is interposed between the head of the bolt 62 and the top surface of the segment 40, the washer 64 being of greater diameter than the width of the slots 58 so that the segment 40 is capable of radial movement with respect to the driving plate 30. A coil spring 66 is provided between each of the bolts 62 and the adjacent stop shoulder 60 with one end of the spring 66 secured on the bolt 62 and the other end entering into a hole 68 provided in the stop shoulder 60 adjacent the flange 54.

As best seen in Figure 2, each of the segments 40 are so mounted on the driving plate 30 that the laterally extending shoe 52, stop shoulders 60 and the flange 54 thereof extend in a direction parallel to the direction in which the annular flange 34 extends, with the shoe 52 closely spaced from the annular flange 34 and generally concentric therewith.

A pin or rivet 70 carried by the driving plate 30 extends upwardly therefrom and enters through the slot 56 in each of the segments 40 adjacent the end of the slot 56 remote from the flange 54. One end of a pair of springs 72 and 73 are secured to the rivet 70 and extend in divergent relation to each other therefrom having their other ends secured to opposite ends of an anchor plate 74 and extends parallel to the flange 54 in spaced relation thereto, the anchor plate 74 is secured along one transverse edge of the head or cross piece 76 of a weighted arm or pendulum, generally indicated at 78, as by welding, and extends equidistantly beyond the head 76.

The pair of springs 72 and 73 are associated with each of the weighted arms 78 to act as resilient means maintaining each arm 78 in the desired angular relation to the operatively associated segment 40 when the clutch is inoperative. That is, the springs 72 and 73 keep each arm 78 in a position extending centrally radially to and inwardly of the flange 54 along the longitudinal center line of the segment 40 which is coincident with the radial line along which the arm 78 extends. Each arm will then be maintained by the pair of springs 72 and 73 with its longitudinal center line perpendicular to flange 54.

One weighted arm or pendulum 78 is associated with each of the segments 40. The head 76 having one longitudinal edge remote from the anchor plate 74 in contact with the inner surface 55 of the flange 54 and a short, solid cylindrical trunnion 80 formed integrally with the head 76 and extending perpendicularly from the main portion of the weighted arm 78 is received in the slot 56 and adapted to slide longitudinally thereof. A shank portion 82 is formed integrally with and is carried by the head 76 and depends perpendicularly therefrom, the sides of the shank 82 being somewhat divergent downwardly and carrying at its lower end a circular weight 84 disposed symmetrically with respect to the shank 82. The shank 82 and the weight 84 depend centrally from the head 76 and is in the form of a pendulum adapted to swing in an arcuate path.

An opening 86 is drilled through the upper end of the shank 84 and extends centrally through the head 76 and the trunnion 80 so that a rivet or pin 88 may be received therein to secure the weighted arm 78 to the driving plate 30 by entering an opening in the plate 30 in register with the opening 86. The end of the pin or rivet extending through the plate 30 will be flattened or welded at this point to insure adequate attachment of the weighted arm 78 as it is carried by the plate 30, and it should be noted that the rivet or pin 88 extends through the opening 86 in such manner as to permit the weighted arm to swing in pendulum-like fashion about the rivet 88 as an axis.

As fluid pressure is admitted into the chamber 21 of the housing 10, as previously described, so as to impinge against the vanes 38 to impart rotation to the driving plate 30 in either a clockwise or counter-clockwise direction, each of the weighted arms 78 will be caused to swing about its axis of rotation, rivet 88, in opposition to the resilience of springs 66 and springs 72 and 73 to a position normal to the inoperative position shown in full lines in Figure 1 in response to the centrifugal force introduced by the rotation of the driving plate 30. In Figure 1, the broken line showings of the weighted arms 78 indicate the operative position thereof as the driving plate is caused to rotate in a clockwise direction. As each of the weighted arms 78 swings from its inoperative position in response to centrifugal force, the head 76 acts as a cam bearing against the inner face or surface 55 of the flange 54 thus causing each of the segments 40 to move radially of the driving plate 30 and toward the center thereof and bring the inner surface of the shoe 52 into engagement with the outer surface of the flange 36 of the driven plate 32 so that the motion imparted to the driving plate 30 will be transmitted to the driven plate 32 and subsequently to the drive shaft 28 which is, in effect, a power take-off and may be integrated into any desired machine or apparatus to drive the machine or apparatus.

In order to disengage the centrifugal clutch of the present invention, fluid pressure is cut off or stopped from entering the chamber 21 and the drag caused by the apparatus operatively connected to the drive or power take-off 28 will cause the clutch to lose its momentum and the springs 66 will act upon each of the segments 40 to pull the shoe 52 thereof away from the flange 36 of the driven plate 32. It will be appreciated that in starting the centrifugal clutch in operation to transmit motion from the source of fluid means to a machine or apparatus to be driven thereby, the weighted arms 78 will be initially responsive to inertia forces and then be acted upon by centrifugal forces so that the arms 78 will swing against the resiliency of the springs 66 associated with each of the segments 40 and the pair of springs 72 and 73, and at a given rotational speed, directly proportional to the strength of the spring 66 resilience, the arms 78 will swing in pendulum-like fashion so as to cause the head 76 to act as a cam and ride on the surface 55 which may be referred to as a camming surface, and thereby cause engagement between the driving plate 30 and the driven plate 32 so that the centrifugal clutch will act as a motion transmission means.

From the foregoing, it is apparent that there has been provided a centrifugal clutch, as a motion transmission means, having a driving member 30, a driven member 32 and means carried by the driving member to engage the driven member as the driving member is rotated in response to fluid pressure applied to the periphery thereof, the means engaging the driving member to the driven member is so carried by the driving means that it will move radially thereof in response to the centrifugal force caused by the rotation of the driving member to place the engaging means in contact with the driven member so that the driven member will be rotated along with the driving member. Means are carried by the driving member, in the form of weighted arms 78, which are operatively connected to the engaging means to move the engaging means in its radial path of movement in response to the centrifugal force imparted thereto by the rotation of the driving member.

It should also be noted that the weighted arms 78 will move simultaneously or in concert so that each of the plate-engaging segments 40 will contact the driven plate 30 at approximately the same time.

During testing of this centrifugal clutch, it was found that engagement between the driving and driven members would be accomplished in between one and two seconds of the time a driving member started its rotational movement, or from the time fluid pressure had been introduced into the chamber of the housing so as to impinge upon the vanes carried by the driving member to cause rotation thereof.

It is also pointed out that when an arm 78 is operatively connected with a segment 40, a cam or head 76 will be disposed upon the face of the body 42 and in contact with the camming surface 55 of the flange 54, and the shank and weight portions, 82 and 84 respectively, will be so disposed that the upper portion of the shank 82 adjacent the head 76 will rest upon the top edge of the flange 54. In other words, the cam or head 76 is laterally offset with respect to the shank 82 and weight 84 of the arm 78.

While there are shown and described the preferred embodiments of the invention, it is to be understood that the structure is susceptible to change and modification within the practicability of the invention and therefore should be limited only by the scope of the claims appended hereto.

1. A centrifugal clutch comprising a circular driving member and a circular driven member of a smaller diameter mounted for rotation about a common axis in spaced face to face relation, means for imparting rotation to said driving member, an upstanding peripheral flange on said driven member extending toward driving member, a plurality of segments carried by said driving member in spaced angular relation to each other for rotation with said driving member and for movement radially thereof, each of said segments having a shoe at one end thereof disposed outwardly of said flange and frictionally engageable with said flange upon inward radial movement of the associated segment, a plurality of weighted arms carried by said driving member for pendulum-like swinging movement about spaced axes adjacent the other ends of said segments and parallel to and concentric about said common axis in response to the centrifugal force resulting from rotation of said driving member, one of said arms being operatively connected with one of said segments to move the associated shoe on the segment into frictional engagement with said flange on said driven member as the weighted arm is swung in response to the centrifugal force to thereby transmit the rotation of said driving member to said driven member.

2. A centrifugal clutch comprising a circular driving member and a circular driven member of a smaller diameter mounted for rotation about a common axis in spaced face to face relation, means for imparting rotation to said driving member, an upstanding peripheral flange on said driven member extending toward driving member, driven member engaging means including a shoe disposed in face to face relation with said flange mounted on said driving member for rotation therewith and for movement radially thereof adjacent the periphery of said driving member with said shoe being disposed outwardly of said flange, resilient means operatively connected between said driving member and said engaging means to bias said engaging means radially outwardly and space said shoe from said flange, weighted means carried by said driving member for swinging movement about an axis parallel to said common axis in response to rotation of said driving member and operatively connected to said engaging means for moving the latter radially inwardly against the bias of said resilient means into frictional engagement with said flange to thereby transmit the rotation of said driving member to said driven member, said driven plate engaging means including a segment upon one end of which said shoe is carried, an upstanding flange carried by said segment adjacent the other end thereof, the inner face of said flange defining a cam surface, a cam carried by said weighted means for movement therewith and engageable with said cam surface so that said cam will ride on said cam surface as said weighted means swings in response to rotation of said driving member to cause movement of the segment radially inwardly with respect to said driving member against the bias of said resilient means.

References Cited in the file of this patent

UNITED STATES PATENTS

| | | |
|---|---|---|
| 723,196 | Dysterud | Mar. 17, 1903 |
| 743,143 | Brown | Nov. 3, 1903 |
| 857,970 | Wust-Kunz | June 25, 1907 |
| 1,440,161 | Lippincott | Dec. 26, 1922 |
| 2,400,585 | Wolff | May 21, 1946 |
| 2,596,276 | Napoli | May 13, 1952 |

FOREIGN PATENTS

| | | |
|---|---|---|
| 43,414 | Germany | May 31, 1888 |
| 501,984 | France | Feb. 9, 1920 |